United States Patent
Tisdale

(10) Patent No.: US 9,633,118 B2
(45) Date of Patent: Apr. 25, 2017

(54) EDITORIAL SERVICE SUPPORTING CONTRASTING CONTENT

(75) Inventor: Jamey Tisdale, Duvall, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 295 days.

(21) Appl. No.: 13/418,354

(22) Filed: Mar. 13, 2012

(65) Prior Publication Data
US 2013/0246559 A1    Sep. 19, 2013

(51) Int. Cl.
| | | |
|---|---|---|
| *G06F 15/173* | (2006.01) | |
| *G06F 17/00* | (2006.01) | |
| *G06F 7/00* | (2006.01) | |
| *G06Q 30/00* | (2012.01) | |
| *G06Q 30/02* | (2012.01) | |
| *G06F 17/30* | (2006.01) | |
| *H04L 29/08* | (2006.01) | |
| *G06F 11/34* | (2006.01) | |

(52) U.S. Cl.
CPC ....... *G06F 17/30867* (2013.01); *G06Q 30/02* (2013.01); *G06F 11/3438* (2013.01); *G06F 17/30873* (2013.01); *G06F 17/30899* (2013.01); *G06Q 30/0255* (2013.01); *G06Q 30/0256* (2013.01); *H04L 67/306* (2013.01)

(58) Field of Classification Search
CPC ...... G06F 17/30592; G06Q 30/0207–30/0277; G06Q 30/02; H04L 67/306
See application file for complete search history.

(56) References Cited

U.S. PATENT DOCUMENTS

| | | | | |
|---|---|---|---|---|
| 8,606,643 | B2* | 12/2013 | Lawrence et al. | 705/26.1 |
| 8,966,036 | B1* | 2/2015 | Asgekar | G06F 7/00 707/706 |
| 2001/0049701 | A1* | 12/2001 | Howerton et al. | 707/513 |
| 2005/0198056 | A1 | 9/2005 | Dumais et al. | |
| 2007/0033224 | A1* | 2/2007 | Allen | G06F 17/30899 |
| 2009/0048823 | A1 | 2/2009 | Liu et al. | |
| 2009/0112892 | A1 | 4/2009 | Cardie et al. | |
| 2009/0119275 | A1 | 5/2009 | Chen et al. | |
| 2009/0144780 | A1* | 6/2009 | Toebes et al. | 725/87 |
| 2009/0164408 | A1 | 6/2009 | Grigorik et al. | |
| 2009/0271256 | A1* | 10/2009 | Toebes et al. | 705/14 |
| 2009/0319342 | A1 | 12/2009 | Shilman et al. | |
| 2010/0036839 | A1* | 2/2010 | Kamimaeda et al. | 707/5 |

(Continued)

OTHER PUBLICATIONS

Michelle, Panzorini, U.S. Appl. No. 61/572,139 Hypetree provisional Patent Details, Jul. 12, 2011.*

(Continued)

*Primary Examiner* — Nicholas Taylor
*Assistant Examiner* — Ho Shiu

(57) ABSTRACT

An editorial service analyzes the web behavior of a group of users in order to classify users into user types and contrasting types. A user type is a classification that is based on the type of web-accessed content that a user typically views. A contrasting type represents a classification that is based on web-accessed content that a user rarely views. A content provider may utilize a user's contrasting type to present divergent or contrasting content to a user thereby engaging the user to stay on and interact with the content provider's web site or application longer.

18 Claims, 7 Drawing Sheets

(56) References Cited

U.S. PATENT DOCUMENTS

| | | | |
|---|---|---|---|
| 2010/0070454 A1* | 3/2010 | Masuda et al. | 706/54 |
| 2011/0106630 A1* | 5/2011 | Hegeman et al. | 705/14.71 |
| 2011/0161242 A1* | 6/2011 | Chung et al. | 705/347 |
| 2011/0270836 A1* | 11/2011 | Yang et al. | 707/737 |
| 2012/0253930 A1* | 10/2012 | Gao et al. | 705/14.53 |
| 2012/0323698 A1* | 12/2012 | Disman | 705/14.67 |
| 2013/0006758 A1* | 1/2013 | Hegeman et al. | 705/14.46 |
| 2013/0073362 A1* | 3/2013 | Panzironi et al. | 705/14.19 |
| 2013/0073673 A1* | 3/2013 | McMahon et al. | 709/217 |

OTHER PUBLICATIONS

Wang, et al., "A Pilot Study of Opinion Summarization in Conversations", Retrieved at <<http://aclweb.org/anthology/P/P11/P11-1034.pdf>>, Proceedings of the 49th Annual Meeting of the Association for Computational Linguistics, Jun. 24, 2011, pp. 331-339.
Ku, et al., "Opinion Extraction, Summarization and Tracking in News and Blog Corpora", Retrieved at <<http://nlg18.csie.ntu.edu.tw:8080/lwku/SS0603KuLW.pdf>>, Spring Symposium on Computational Approaches to Analyzing Weblogs, 2006, pp. 100-107.

* cited by examiner

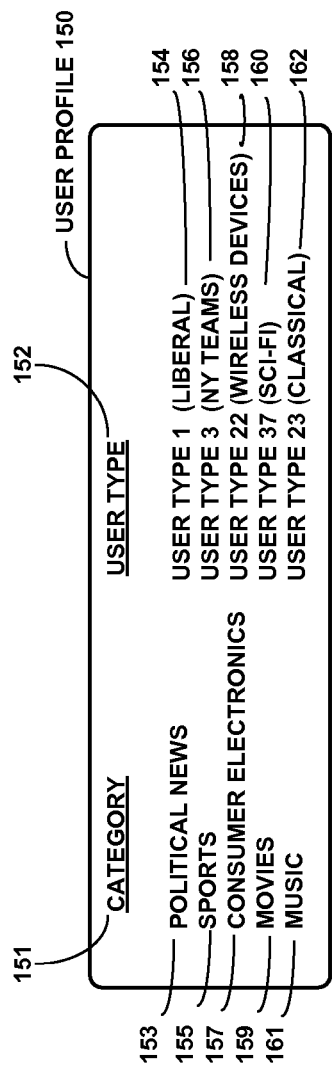
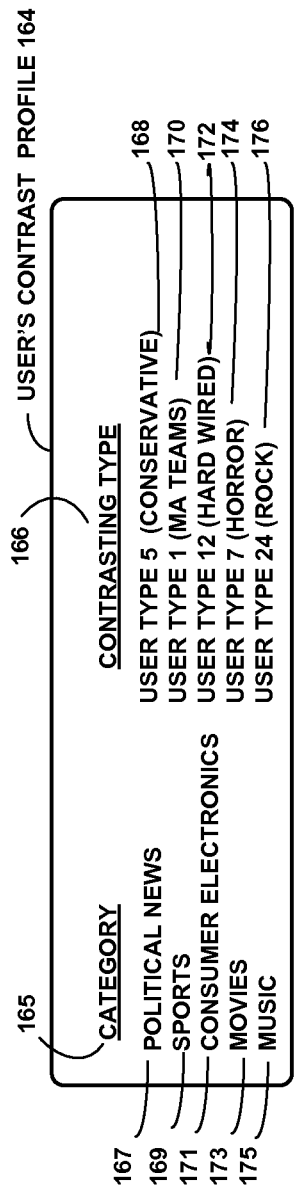
FIG. 2
FIG. 3

EDITORIAL SERVICE SUPPORTING CONTRASTING CONTENT

BACKGROUND

Personal opinions are a prospective means to detect trends in products, services, or topics in the news. The Internet has led to the proliferation of online opinions that may be found in a variety of web-accessible sources. Online opinions may be found in reviews, ratings, and recommendations, which may be part of blogs, social networks, product web sites, news articles, online forums and so forth. The online opinions are useful to get anonymously consumers' insight into the latest trends which may be used to initiate future developments of new products and services, to improve the marketability of a product or service, to introduce a product in the marketplace, to reveal issues that affect a customer's opinion and to identify popular topics of interest.

Natural language programming tools, such as sentiment analysis, have attempted to automate the process of detecting opinions from online sources. These tools attempt to capture the sentiment expressed in sentences based on the use of particular words or phrases in a particular context. However, there are nuances with a human language, such as cultural factors, that make sentiment analysis unreliable for automatically detecting opinions from online data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An editorial service analyzes the web behavior of users accessing content on various web sites in order to determine user types and contrasting types. A user type is a classification of content that a user normally enjoys. A user's contrasting type identifies a type of content that is divergent or contrasting to the content that the user normally enjoys. The web behavior may include web-accessible content that a user engages with (e.g., forums, blogs, bulletin boards, etc.), web sites accessed by a user, user provided preferences, and search engine results. By knowing a user's contrasting type, a content provider is able to provide contrasting content to a user in addition to the content the user selects thereby engaging the user to spend more time at the content provider's web site or to take additional actions based on the content (sharing, commenting, etc).

The editorial service may interact with content providers and users to obtain data on the web behavior of a group of users. The editorial service may utilize a learning module to analyze the data and to classify the users into N user types. A user may be associated with a particular user type. The learning module may also determine a contrasting type for each user type. A contrasting type denotes a user type that is associated with web-accessible content that does not overlap, to a degree, with the web-accessible content that is associated with a user's user type. A user's contrasting type may then be provided to a content provider, such as a news service, for use in providing the user with news that is divergent or contrasting to the news the user normally views.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 2 illustrates an exemplary user profile.

FIG. 3 illustrates an exemplary user's contrast profile.

DETAILED DESCRIPTION

Various embodiments pertain to an editorial service supporting contrasting content. In one or more embodiments, the editorial service may be utilized in a system having content providers that provide content accessible to users through the Internet. The content providers may wish to provide a user with content that is of a divergent or contrasting type to the type of content the user normally views. The content provider may access the editorial service for data that the content provider may use to identify the contrasting type of content appropriate for a particular user.

The editorial service analyzes the web behavior of a group of users over a period of time to formulate user types. A user type is a classification that is based on types of content that the user commonly accesses for a particular category of information. A contrasting type is a user type that is divergent or contrasting to the user's user type for a particular category of information.

A content provider may host a web site providing web-accessible content. The content provider may utilize the editorial service to find out the type of contrasting content appropriate for a particular user. A content provider may request from the editorial service a user's contrast profile which identifies the user's contrasting type. The content provider may then obtain content that matches the user's contrasting type which may be provided to the user. By providing contrasting content, such as a contrasting article or news item to a user, a user may be more likely to spend more time visiting and interacting with the content provider's web site. The user may share the content from the content provider with other users, comment on the contrasting content, read the contrasting content, all of which has the user attracted to the content provider's web site.

In one or more embodiments, the content provider may host a news service containing various types of content from current headlines, editorials, weather, political news, sports, classified listings, gossip columns, and the like. The content provider may wish to provide the user with a news article that is divergent or contrasting to the type of content the user normally reviews. The editorial service may provide the content provider with the user's contrast profile so that the content provider may select contrasting content tailored for a user. In this manner, the content provider entices the user to stay at the content provider's web site for a longer period of time as well as potentially increasing the likelihood of the user engaging with that content (e.g., comments, sharing, forum discussions, etc.).

Figure 1:
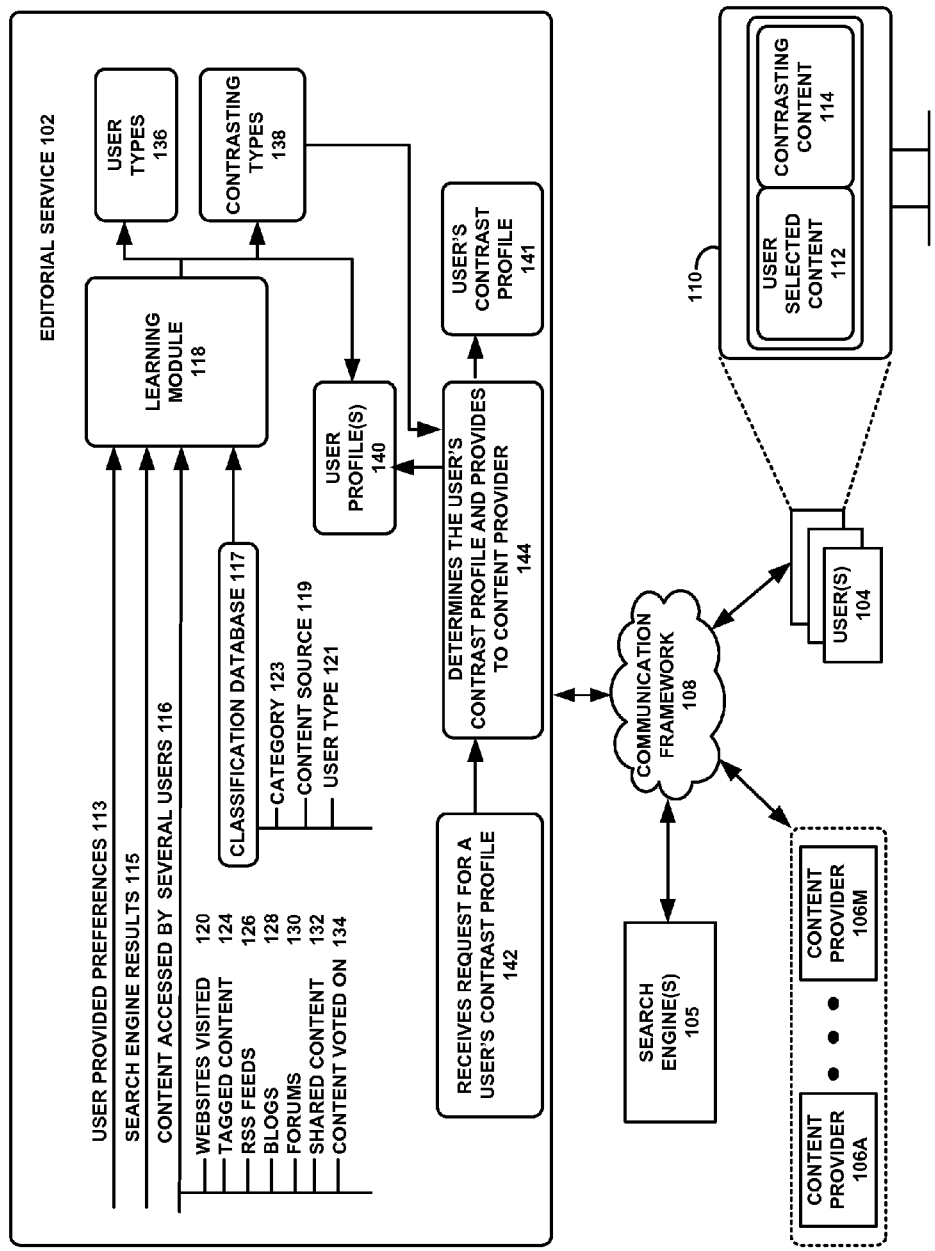
FIG. 1 is a block diagram illustrating an exemplary system utilizing an editorial service supporting contrasting content.

Attention now turns to a more detailed description of an exemplary system 100 utilizing an editorial service supporting contrasting content. FIG. 1 illustrates a block diagram of an exemplary system 100 that may include an editorial service 102, one or more users 104, one or more search engines 105, one or more content providers, 106A-106M (collectively, 106), communicatively coupled through a communications framework 108.

A content provider 106 may be any web-accessible medium that hosts, stores, distributes, or otherwise provides content that is accessed via the Internet (i.e., web-accessible content). The content may be any type of digitized content, such as without limitation, text, graphics, audio, visual content, or any combination thereof. The content may also include the URL of the website hosting the content or any other identifier of the source of the content. In one or more embodiments, the content provider 106 may be a web site that provides content in an organized manner. For example, a content provider 106 may be a web site hosting a news service (e.g., www.nypostonline.com, www.nytimes.com, www.nydailynews.com, www.cnn.com). A content provider 106 may also be a web site hosting a blog, a forum, a bulletin board, Really Simple Syndication (RSS) feeds, and the like. By way of another example, a content provider 106 may be a social networking web site that hosts content with the ability for a user to engage with the content, such as comment on the content, vote on the content, and so forth.

In one or more embodiments, a content provider 106 may be implemented as a computing device. The computing device may be any type of electronic device capable of executing programmable instructions such as, without limitation, a mobile device, a personal digital assistant, a mobile computing device, a smart phone, a cellular telephone, a handheld computer, a server, a server array or server farm, a web server, a blade server, a network server, an Internet server, a work station, a mini-computer, a mainframe computer, a supercomputer, a network appliance, a web appliance, a distributed computing system, multiprocessor systems, or combination thereof.

A user 104 may access a content provider 106 through a computing device. The computing device may be any type of electronic device capable of executing programmable instructions such as, without limitation, a mobile device, a personal digital assistant, a mobile computing device, a smart phone, a cellular telephone, a handheld computer, a server, a server array or server farm, a web server, a blade server, a network server, an Internet server, a work station, a mini-computer, a mainframe computer, a supercomputer, a network appliance, a web appliance, a distributed computing system, multiprocessor systems, or combination thereof.

In one or more embodiments, a user 104 may access user selected content 112 from a content provider 106 through a web browser with the content visually displayed on a display 110. The user selected content 112 is chosen by the user. The content provider 106 may also provide contrasting content 114 which may contain content having a contrasting view or topic from the user selected content 112. The contrasting content 114 is not selected by the user. The user selected content 112 and the contrasting content 114 may both be displayed to the user simultaneously. Alternatively, the user selected content 112 may be displayed first with the contrasting content 114 displayed thereafter, or vice versa. The embodiments are not constrained in this manner.

One or more search engines 105 may interact with the editorial service 102. The search engines 105 may be used to provide the editorial service 102 with search results that provide additional sources of content that are indicative of a particular type of content. For example, the search results obtained from a search for a progressive talk show host may yield additional web sites hosting content that may be classified as "Progressive."

A search engine 105 may be implemented as a computing device. The computing device may be any type of electronic device capable of executing programmable instructions such as, without limitation, a mobile device, a personal digital assistant, a mobile computing device, a smart phone, a cellular telephone, a handheld computer, a server, a server array or server farm, a web server, a blade server, a network server, an Internet server, a work station, a mini-computer, a mainframe computer, a supercomputer, a network appliance, a web appliance, a distributed computing system, multiprocessor systems, or combination thereof.

The communications framework 108 is an interconnected system of networks that connects various computing devices together. The communications framework 108 may be utilized to facilitate communications between the users 104, the search engines 105, the content providers 106, and the editorial service 102. In one or more embodiments, the communications framework 108 may be the Internet.

The editorial service 102 may be implemented in the form of a software application residing on one or more computing devices. The editorial service 102 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The editorial service 102 may include a learning module 118 that analyzes the web behavior of various users. The learning module 118 may receive data indicative of the web behavior of various users through user provided preferences 113, search engine results 115, and data (i.e., content accessed by several users) 116 provided by content providers 106. The user provided preferences 113 may be data provided by a user to the editorial service 102 directly that indicates the type of content the user typically views. One or more search engines 105 may provide the editorial service 102 with search results from which the learning module 118 may ascertain additional sources of content that are similar to content that was the subject of a search query. The data provided by the content providers may include content accessed by several users 116, such as without limitation, websites visited 120, tagged content 124, RSS feeds 126, blogs 128, forums 130, shared content 132, content voted on 134, and so forth.

In one or more embodiments, the data may be grouped into categories of information. Each category may be configured to represent a theme, subject or interest, such as genre, viewpoint, type of music, political view, and the like. Each category may contain N user types. For example, a user type of "Conservative" within a category of "Political View" may be assigned to users who access web sites, such as www.foxnews.com and www.teapartypatriots.org, and content from forums such as the National Rifle Association's (NRA) Motion page on a social networking website. In addition, search results from a search query pertaining to a conservative talk show host may provide additional sources of content that may be used to identify the Conservative user type.

The learning module 118 may also utilize a classification database 117 in its analysis. The classification database 117 may include the identity of a content source 119 and its user type 121 within a particular category 123. For example, the classification database 117 may contain the URL of a website, such as www.foxnews.com, and its corresponding user type 121 which may be "Conservative" in the category 123 of Political Views.

A user 104 may be identified to the editorial service 102 through an anonymous identifier, such as without limitation, an account identifier associated with the editorial service, and so forth. A content provider 106 may track the websites and content that a user accesses which the content provider 106 transmits to the learning module 118. Additionally, a user 104 may engage the services of the editorial service 102 directly and provide the content providers and content that the user typically views to the editorial service 102 (i.e., user provided preferences).

The learning module 118 obtains the tracked data for several users over a period of time. The learning module 118 analyzes the tracked data to determine the different user types 136 for a particular category, the contrasting types 138 and a user profile 140 for each user. The learning module 118 analyzes the tracked data to group the users into user types based on overlapping or similar content that the users in the group access. The learning module 118 also determines which user types do not access content that overlaps with other groups (i.e., contrasting types 138). In addition, the learning module 118 creates a user profile 140 for each user that identifies the user's user type for one or more categories. The learning module 118 may continuously update its analysis as new tracked data is obtained and generate updated values for a user's profile 140, the user types 136, and/or the contrasting types 138.

The learning module 118 analyzes the received data to recognize patterns in the data that may be used to formulate the user types and the contrasting types. The learning module 118 may utilize any one or more machine learning and/or pattern recognition techniques to analyze the received data, such as without limitation, decision tree learning, association rule learning, artificial neural networks, inductive logic programming, and the like.

In one or more embodiments, the editorial service 102 may engage in a training phase prior to receiving requests for a specific user's contrast profile. In the training phase, the learning module 118 receives a large amount of training data which may come from the user provided preferences 113, search engine results 115 and/or content tracked from content providers 116. The learning module 118 analyzes the data to recognize patterns in the data which may be used to form the user types and the contrasting types. After completion of the training phase, the learning module 118 may still gather more training data to improve its analysis and to produce more accurate results.

To illustrate the editorial service 102, consider the following example. A user, identified as user#101, is tracked as having visited or accessed the Fox News website, read a NRA newsletter on a social networking website, and visited the Tea Party website. The editorial service analyzes thousands of other users and determines with respect to the category of U.S. Political News, there are six user types. User Type 1 is labeled "Conservative" and user type 5 is labeled "Progressive." The editorial service 102 generates a user profile for user#101 which contains user type 1 within the category of U.S. Political News. The editorial service 102 may also determine that user type 1 and user type 5 are contrasting types (i.e., of the labels in the system, these two have the least amount of overlap for origin of news information).

When user#101 visits a content provider 106 utilizing the editorial service 102, the content provider 106 may query the editorial service 102 for the latest contrasting profile for user#101. The contrasting profile 141 contains a contrasting type. Upon receiving user#101's contrasting profile, the content provider 106 finds the top news or content associated with the contrasting type for the category associated with the content provider. The contrasting content may be displayed along with the user selected content. In addition, the contrasting content may be displayed with a label indicating that it is a divergent opinion.

Although the system 100 as shown in FIG. 1 has a limited number of elements in a certain topology, it may be appreciated that the system 100 may include more or less elements in alternate topologies as desired for a given implementation. For example, the content providers 106 may be part of the editorial service 102, the editorial service 102 may be part of a content provider 106, and/or the editorial service 102 may be part of a larger application, such as a web browser, and the like. The embodiments are not limited in this manner.

In various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

The various elements of system 100 may be communicatively coupled via various types of communications medium as indicated by various lines or arrows. The elements may coordinate operations between each other. The coordination may involve the uni-directional or bi-directional exchange of information. For instance, the elements may communicate information in the form of signals communicated over the communications medium. The information may be implemented as signals allocated to various signal lines. In such allocations, each message is a signal. Further embodiments, however, may alternatively employ data messages. Such data messages may be sent via various connections. Exemplary connections include parallel interfaces, serial interfaces, and bus interfaces.

FIG. 2 illustrates an exemplary user profile 150. In one or more embodiments, the user profile 150 may include several categories 151 where each category has a corresponding user type 152. However, it should be understood that the user profile 150 is not constrained to this example and that other configurations may be utilized for a desired implementation. The embodiments are not limited in this manner.

For example, as shown in FIG. 2, the user profile 150 has five categories: Political News 153; Sports 155; Consumer Electronics 157; Movies 159; and Music 161. For the Political News category 153, the user is classified as user type 1 which corresponds to the label, liberal (LIBERAL) 154. For the Sports category 155, the user is classified as user type 3 which corresponds to the label, New York Teams (NY TEAMS) 156. Likewise, for the Consumer Electronics category 157, the user is classified as user type 22 which is labeled "WIRELESS DEVICES" 158, for the Movies category 159, the user is classified as user type 37 which corresponds to the label, science fiction (SCI-FI) 160, and for the Music category 161, the user is classified as user type 23 which corresponds to the label classical music (CLASSICAL) 162.

Attention now turns to FIG. 3 which illustrates an exemplary user's contrast profile 164 that corresponds to the user profile shown in FIG. 2. The user's contrast profile 164 has the same five categories 165 contained in the user profile shown in FIG. 2 in addition to the contrasting type 166 for each category. For the Political News category 167, the contrasting type for the user is user type 5 which corresponds to the label, conservative (CONSERVATIVE) 168. Based on the web behavior analyzed by the editorial service 102, the learning module 118 has determined that user types 1 and 5 are divergent. That is, content classified as conservative is opposite or contrasted to content classified as liberal.

Likewise, for the Sports category 169, the contrasting type for the user is user type 1 which corresponds to the label, Massachusetts Teams (MA TEAMS) 170; for the Consumer Electronics category 171, the contrasting type for the user is user type 12 which is labeled as hard wired consumer electronic devices (HARD WIRED); for the Movies category 173, the contrasting type for the user is user type 7 which corresponds to Horror movies (HORROR) 174; and for the Music category 175, the contrasting type for the user is user type 24 which corresponds to Rock and Roll music (ROCK) 176.

Attention now turns to operations for the embodiments which are further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 4:
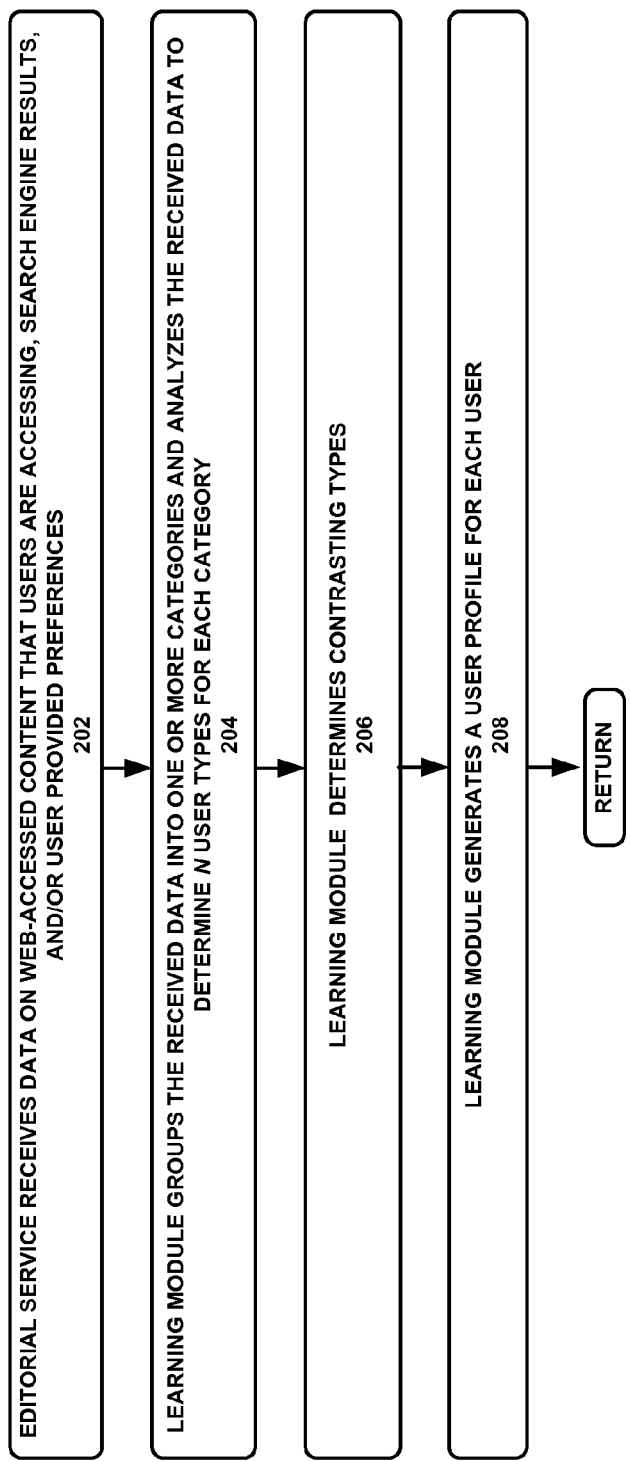
FIG. 4 is a flow diagram illustrating a first exemplary method of the editorial service.

FIG. 4 illustrates a flow diagram of an exemplary method 200 that may be employed by the editorial service 102. It should be noted that the method 200 may be representative of some or all of the operations executed by one or more embodiments described herein and that the method can include more or less operations than that which is described in FIG. 4.

Turning to FIG. 4, the editorial service 102 may receive data from various users 104 and content providers 106 (block 202). The data may be collected over a predetermined period of time during a training phase, collected continuously, or on demand as needed. The data may be received from the various sources as noted above with respect to FIG. 1.

The learning module 118 may group the data into categories and analyze the data in each category to determine a number, N, of user types (block 204). Alternatively, the learning module 118 may be configured with a predetermined number and type of categories. Each user type represents a similar type of web-accessed content that is accessed across an aggregated population of users.

The learning module 118 may then determine which user types are contrasting to each other (block 206). In one or more embodiments, a contrasting type may have no or minimal overlapping content. Alternatively, the learning module 118 may determine which user types are contrasting based on a threshold amount of content that may overlap or not overlap with another user type. The threshold may be expressed in terms of a percentage or other mathematical formulae. For example, if user type 1 has 95% non-overlapping content with respect to the content associated with user type 2, then user type 1 and user type 2 may be deemed contrasting types with respect to each other. By way of another example, if user type 3 has 4% overlapping content with respect to the content associated with user type 5, then user type 3 and user type 5 may be deemed to be contrasting types with respect to each other. Next, the learning module 118 may generate a user profile for each user where the user profile identifies a user's user type (block 208).

In one or more embodiments, the steps shown in FIG. 4 may be executed initially in a training phase. One or more steps may be repeated thereafter as additional data is received and the learning module 118 may update the user types 136, user profiles 140, and contrasting types 141 accordingly.

Figure 5:
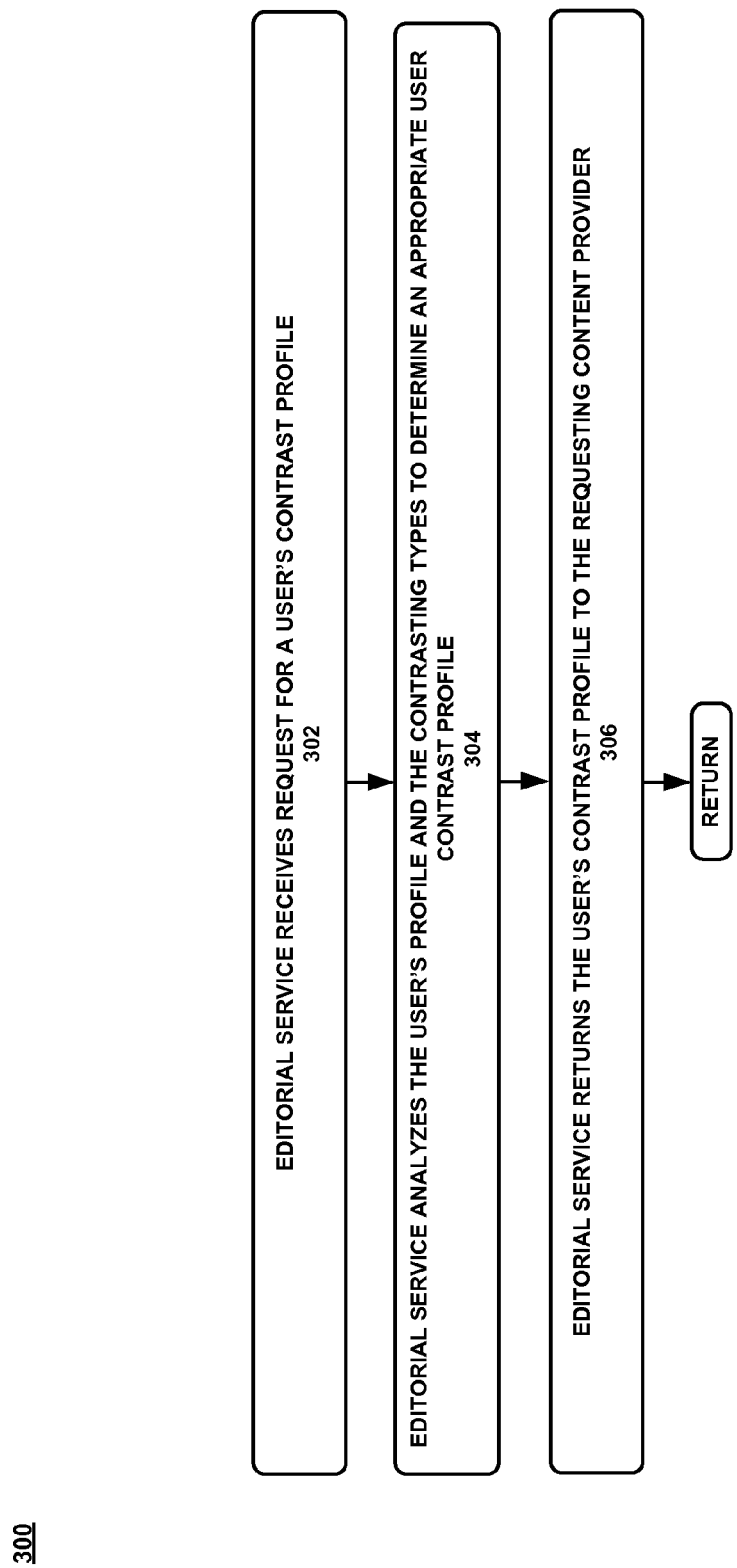
FIG. 5 is a flow diagram illustrating a second exemplary method of the editorial service.

FIG. 5 illustrates a flow diagram of another exemplary method 300 that may be employed by the editorial service 102. It should be noted that the method 300 may be representative of some or all of the operations executed by one or more embodiments described herein and that the method can include more or less operations than that which is described in FIG. 5.

A content provider 106 associated with the editorial service 102 may request a user's contrast profile 141 for a particular user. The editorial service 102 receives the request (block 302) and utilizes the current contrasting types 138 and the user's user profile 140 to determine the user's contrast profile (block 304). The user's contrast profile 141 may be returned to the requesting content provider 106 (block 306).

Figure 6:
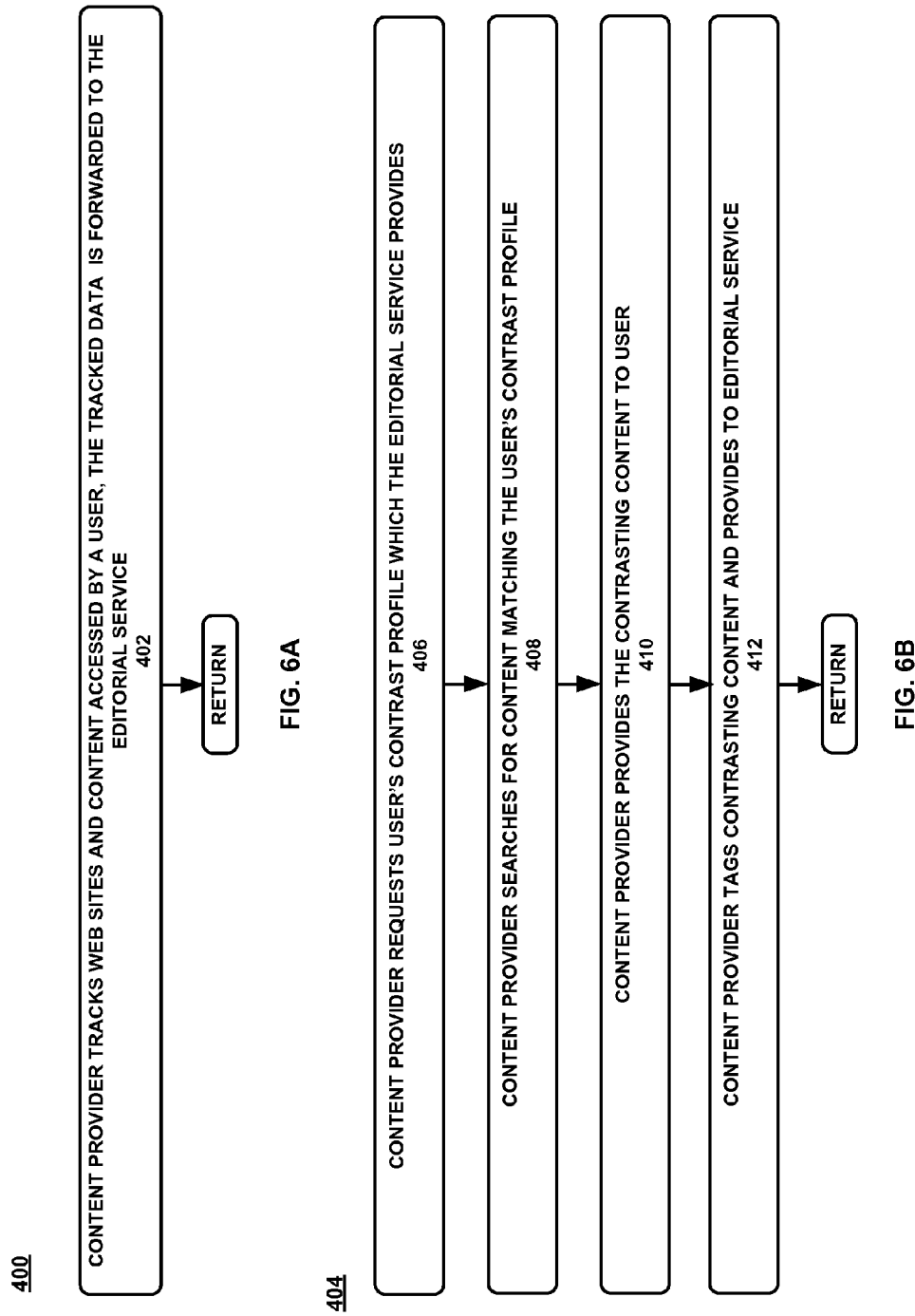
FIGS. 6A-6B are flow diagrams illustrating exemplary methods of a content provider.

FIGS. 6A and 6B illustrate flow diagrams of exemplary methods 400, 404 that may be employed by a content provider 106. It should be noted that each method 400, 404 may be representative of some or all of the operations executed by one or more embodiments described herein and that the method can include more or less operations than that which is described in FIGS. 6A-6B.

Referring to FIG. 6A, a content provider 106 may track the content that a user accesses (block 402). The content provider 106 may utilize any tracking mechanism, such as cookies, agents, audit logs, trace events, and so forth to track a user's access to and engagement with content provided by the content provider 106. The tracked data may be forwarded to the editorial service 102 continuously, at designated points in time, or in any time so desired (block 402).

Referring to FIG. 6B, a content provider 106 may request from the editorial service 102 a user's contrast profile 141 (block 406). Upon receipt of the user's contrast profile 141, the content provider 106 searches for content matching the user's contrast profile 141 (block 408). The content may be the first or top item of a web site matching the user's contrast profile 141 (block 408). The contrasting content may come from the content provider or an affiliate of the content provider. Alternatively, the content provider may have to search for the content on a web site or other server.

The content provider 106 may then provide the contrasting content 114 to the user 104 (block 410). In one or more embodiments, the contrasting content 114 may not be requested or selected by the user. Rather the content provider 106 provides the contrasting content 114 automatically without the user's request. Alternatively, the contrasting content 114 may be offered to the user when the user requests contrasting content. The contrasting content 114 may be visually displayed to the user along with the user selected content 112. The contrasting content 114 may be labeled as a divergent opinion. Additionally, the content provider 106 may tag the contrasting content 114 with an appropriate content classification and provide it to the editorial service (block 412).

Figure 7:
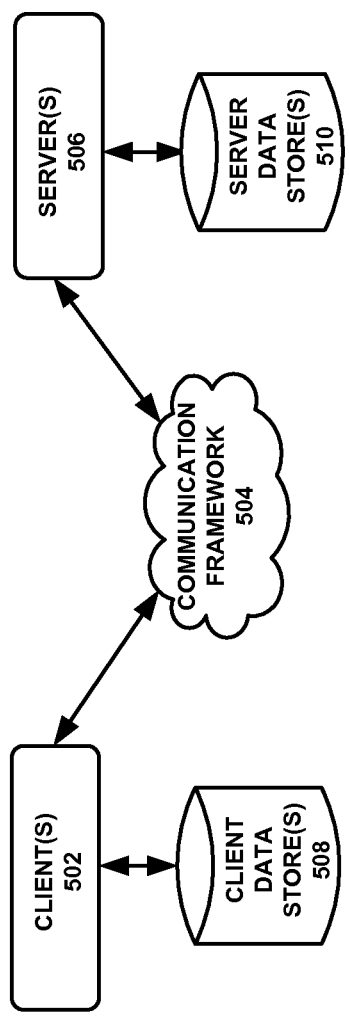
FIG. 7 is a block diagram illustrating an exemplary operating environment.

Attention now turns to a discussion of an exemplary operating environment. FIG. 7 illustrates a first operating environment 500. It should be noted that the operating environment 500 is exemplary and not intended to suggest any limitation as to the functionality of the embodiments. The embodiments may be applied to an operating environment 500 having one or more client(s) 502 in communication through a communications framework 504 with one or more server(s) 506. The operating environment 500 may be configured in a network environment, a distributed environment, a multiprocessor environment, or a stand-alone computing device having access to remote or local storage devices.

A client 502 may be embodied as a hardware device, a software module, or a combination thereof. The client 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The client 502 may also be embodied as a software module having instructions that execute in a single execution path, multiple concurrent execution paths (e.g., thread, process, etc.), or in any other manner.

A server 506 may be embodied as a hardware device, a software module, or as a combination thereof. The server 506 may be any type of electronic device capable of executing programmable instructions such as, without limitation, a mobile device, a personal digital assistant, a mobile computing device, a smart phone, a cellular telephone, a handheld computer, a server, a server array or server farm, a blade server, a web server, a network server, an Internet server, a work station, a mini-computer, a mainframe computer, a supercomputer, a network appliance, a web appliance, a distributed computing system, multiprocessor systems, or combination thereof. The server 506 may also be embodied as a software module having instructions that execute in a single execution path, multiple concurrent execution paths (e.g., thread, process, etc.), or in any other manner.

The communications framework 504 facilitates communications between the clients 502 and the servers 506. The communications framework 504 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). A client 502 and a server 506 may include various types of standard communication elements designed to be interoperable with the communications framework 504, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Each client(s) 502 may be coupled to one or more client data store(s) 508 that store information local to the client 502. Each server(s) 506 may be coupled to one or more server data store(s) 510 that store information local to the server 506.

Figure 8:
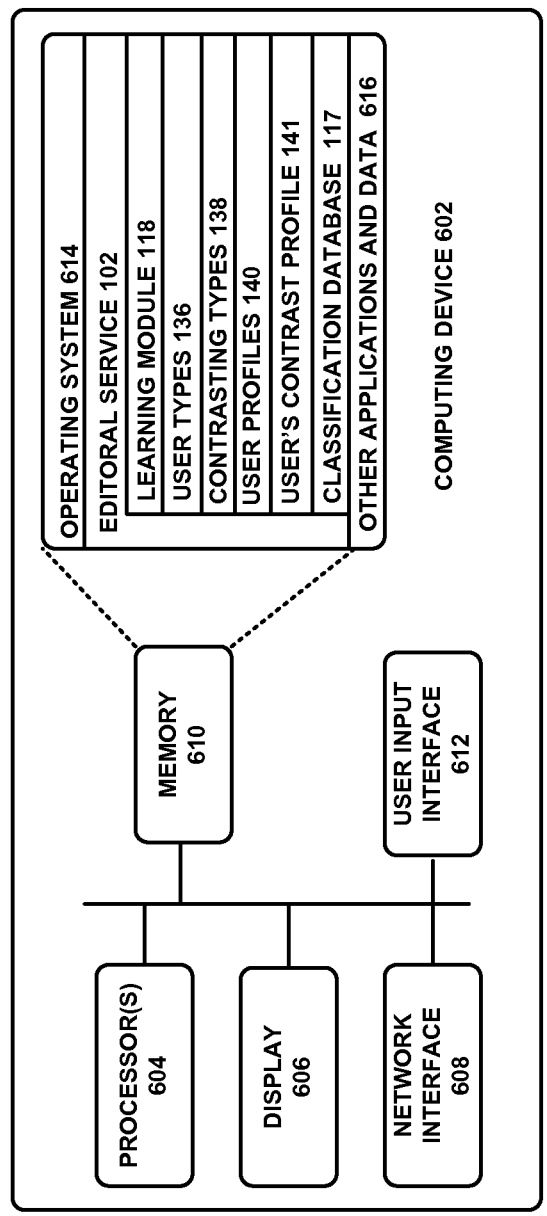
FIG. 8 is a block diagram illustrating an exemplary computing device.

FIG. 8 illustrates a block diagram of an exemplary computing device 602. The computing device 602 may have one or more processors 604, a display 606, a network interface 608, a memory 610, and a user input interface 612. A processor 604 may be any commercially available processor and may include dual or quad microprocessors, multi-core processors, and multi-processor architectures. The display 606 may be any visual display unit. The network interface 608 facilitates wired or wireless communications for the computing device 602 to communicate with other devices. The user input interface 612 facilitates communications between the computing device 602 and input devices, such as a keyboard, mouse, pointer, and the like and may receive input through a gesture, touch, voice, and the like.

The memory 610 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 610 may also include one or more external storage devices or remotely located storage devices. The memory 610 may contain instructions and data as follows:

an operating system 614;
    an editorial service 102 having a learning module 118, one or more user types 136, one or more contrasting types 138, one or more user profiles 140, one or more user's contrast profiles 141, and a classification database 117; and
    various other applications and data 616.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The technology described herein is beneficial at providing divergent content and choices for other scenarios in addition to a news service. One skilled in the art may easily tailor the technology to provide divergent choices for retail scenarios, for advertising, and so forth. In a retail scenario, a user may be provided with divergent items than those that the user selects. For example, a teenage girl may be provided with vintage dress selections when searching for dress apparel considered the latest trend.

What is claimed:

1. A computer-implemented method, comprising:
   hosting a website providing web-accessible content;
   aggregating data from tracking web behavior of a plurality of users that access various types of content on a plurality of websites into categories, the categories based on a type of content;
   generating a plurality of user types based on the categories, a user type describing a group of users who access a similar category of web content and who do not access content associated with other user types;
   associating a first user type for a first user from the plurality of user types;
   determining a contrasting type for the first user, the contrasting type is divergent to the first user type;
   receiving a request for web-accessible content by the first user;
   obtaining content associated with the contrasting type; and
   providing web-accessible content to the first user, the web-accessible content including the requested content and the content associated with the contrasting type, wherein by providing the content associated with the contrasting type a user is engaged to spend more time at the website or to take additional actions based on the web-accessible content.

2. The computer-implemented method of claim 1, wherein generating a plurality of user types further comprises:
   grouping the data into one or more categories, each category associated with a specific subject; and
   analyzing the data in each category to determine the plurality of user types.

3. The computer-implemented method of claim 2, wherein a category is associated with a theme, subject, genre, viewpoint, type of music, or political view.

4. The computer-implemented method of claim 2, wherein the contrasting type does not overlap with the user type.

5. The computer-implemented method of claim 1, wherein generating a plurality of user types further comprises:
   obtaining the data associated with the web behavior from activities performed on the hosted website.

6. The computer-implemented method of claim 1, wherein the hosted website hosts one or more of a news service, a blog, forum, bulletin board, a social networking web site or Really Simple Syndication (RSS) feeds.

7. The computer-implemented method of claim 1, wherein determine a contrasting type for the first user further comprises:
   generating the contrasting type based on content that overlaps within a prescribed threshold with the web-accessible content that is associated with the user type of the first user.

8. The computer-implemented method of claim 1, further comprising:
   generating a user profile for the first user including the contrasting type of the first user; and
   providing the user profile to one or more content providers.

9. A system, comprising:
   at least one processor and a memory;
   a first module including processor-executable instructions that when executed on the at least one processor is configured to:
     analyze web content accessed by a plurality of users in order to generate one or more user types, a user type describing a group of users who access a similar category of web content; and
     associate a first user with a user type and a contrasting type, the contrasting type divergent to and not overlapping with the user type associated with the first user;
   a second module including processor-executable instructions that when executed on the at least one processor is configured to:
     host a website that provides user-selected content and contrasting content to the first user to view in a web browser, the user-selected content chosen by the first user, the contrasting content provided by the website, the contrasting content associated with a contrasting type that is divergent to the user type associated with the first user; and
   a learning module that tracks the web content accessed by the plurality of users, groups the tracked web content into categories based on a type of the web content, and generates user types within the categories, wherein the user types are based on a similar category of content that users in a category access, wherein the learning module determines which user types do not access content that is associated with other user types, wherein by providing the contrasting content a user is engaged to spend more time at the website or to take additional actions based on the user-selected content and/or contrasting content.

10. The system of claim 9, wherein the first module is associated with an editorial service and the second module is associated with a content provider.

11. The system of claim 9, wherein the learning module utilizes pattern recognition techniques and/or machine learning techniques to formulate the user types.

12. A device, comprising:
at least one processor and a memory; wherein the at least one processor is configured:
analyze web accesses made to various types of content by a plurality of users;
groups the web accesses into categories based on a type of the content;
recognize patterns in the web accesses to generate a plurality of user types, a user type describing a group of users who access a similar category of web content and who do not access content that is associated with other user types;
associate a select one of the plurality of user types with a first user; receive a request for content by the first user;
associate a contrasting type for the first user, the contrasting type associated with a type of content divergent to and not overlapping with a type of content normally accessed by the first user; and
generate content for display in a web browser that includes the requested content and content associated with the contrasting type;

wherein by providing the content associated with the contrasting type a user is engaged to spend more time at a website providing the displayed content or to take additional actions based on the displayed content.

13. The device of claim 12, wherein the web accesses are obtained from one or more of search engine results, user provided preferences, or content providers of web-accessible content.

14. The device of claim 12, wherein associate a contrasting type for the first user further comprises:
determine which user types are not associated with overlapping types of content; and
identify the contrasting type of content for the first user as being a user type with minimal overlapping content.

15. The device of claim 12, wherein associate a contrasting type for the first user further comprises:
obtain user provided preferences that indicate a type of content preferred by the first user for use in determining the contrasting type of content for the first user.

16. The device of claim 12, wherein the at least one processor is further configured to:
host a web service that provides the content for display in a web browser.

17. The device of claim 12, wherein the at least one processor is further configured to:
host a social networking web site that provides the content for display in a web browser.

18. The device of claim 12, wherein the at least one processor is further configured to: host a web site that provides content to engage a user to comment on the content.

* * * * *